United States Patent
Bechtolsheim et al.

(10) Patent No.: US 6,377,577 B1
(45) Date of Patent: Apr. 23, 2002

(54) ACCESS CONTROL LIST PROCESSING IN HARDWARE

(75) Inventors: Andreas V. Bechtolsheim, Stanford; David R. Cheriton, Palo Alto, both of CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/108,071

(22) Filed: Jun. 30, 1998

(51) Int. Cl.[7] .................................................. G06F 9/34
(52) U.S. Cl. .................... 370/392; 370/395.32; 370/389
(58) Field of Search .................................. 370/392, 393, 370/394, 396, 397, 398, 399, 400, 389, 395.32; 709/220, 221, 222, 227, 228, 229

(56) References Cited

U.S. PATENT DOCUMENTS

| | | |
|---|---|---|
| 4,131,767 A | 12/1978 | Weinstein |
| 4,161,719 A | 7/1979 | Parikh et al. |
| 4,316,284 A | 2/1982 | Howson |
| 4,397,020 A | 8/1983 | Howson |
| 4,419,728 A | 12/1983 | Larson |
| 4,424,565 A | 1/1984 | Larson |
| 4,437,087 A | 3/1984 | Petr |
| 4,438,511 A | 3/1984 | Baran |
| 4,439,763 A | 3/1984 | Limb |
| 4,445,213 A | 4/1984 | Baugh et al. |
| 4,446,555 A | 5/1984 | Devault et al. |
| 4,456,957 A | 6/1984 | Schieltz |
| 4,464,658 A | 8/1984 | Thelen |
| 4,499,576 A | 2/1985 | Fraser |
| 4,506,358 A | 3/1985 | Montgomery |
| 4,507,760 A | 3/1985 | Fraser |
| 4,532,626 A | 7/1985 | Flores et al. |
| 4,644,532 A | 2/1987 | George et al. |
| 4,646,287 A | 2/1987 | Larson et al. |
| 4,677,423 A | 6/1987 | Benvenuto et al. |
| 4,679,189 A | 7/1987 | Olson et al. |
| 4,679,227 A | 7/1987 | Hughes-Hartogs |
| 4,723,267 A | 2/1988 | Jones et al. |
| 4,731,816 A | 3/1988 | Hughes-Hartogs |

(List continued on next page.)

OTHER PUBLICATIONS

Alessandri, Access Control List Processing in Hardware, Diploma Thesis, ETH, pp. 1–85, Oct. 1997.*

Primary Examiner—Wellington Chin
Assistant Examiner—Frank Duong
(74) Attorney, Agent, or Firm—Skjerven Morrill MacPherson LLP (57) ABSTRACT

The invention provides for hardware processing of ACLs and thus hardware enforcement of access control. A sequence of access control specifiers from an ACL are recorded in a CAM, and information from the packet header is used to attempt to match selected source and destination IP addresses or subnets, ports, and protocols, against all the ACL specifiers at once. Successful matches are input to a priority selector, which selects the match with the highest priority (that is, the match that is first in the sequence of access control specifiers). The specified result of the selected match is used to permit or deny access for the packet without need for software processing, preferably at a rate comparable to wirespeed. The CAM includes an ordered sequence of entries, each of which has an array of ternary elements for matching "0", "1", or any value, and each of which generates a match signal. The ACL entered for recording in the CAM can be optimized to reduce the number of separate entries in the CAM, such as by combining entries which are each special cases of a more general access control specifier. A router including the CAM can also include preprocessing circuits for certain range comparisons which have been found both to be particularly common and to be otherwise inefficiently represented by the ternary nature of the CAM, such as comparisons of the port number against known special cases such as "greater than 1023" or "within the range 6000 to 6500".

31 Claims, 3 Drawing Sheets

U.S. PATENT DOCUMENTS

| | | |
|---|---|---|
| 4,750,136 A | 6/1988 | Arpin et al. |
| 4,757,495 A | 7/1988 | Decker et al. |
| 4,763,191 A | 8/1988 | Gordon et al. |
| 4,769,810 A | 9/1988 | Eckberg, Jr. et al. |
| 4,769,811 A | 9/1988 | Eckberg, Jr. et al. |
| 4,771,425 A | 9/1988 | Baran et al. |
| 4,819,228 A | 4/1989 | Baran et al. |
| 4,827,411 A | 5/1989 | Arrowood et al. |
| 4,833,706 A | 5/1989 | Hughes-Hartogs |
| 4,835,737 A | 5/1989 | Herrig et al. |
| 4,879,551 A | 11/1989 | Georgiou et al. |
| 4,893,306 A | 1/1990 | Chao et al. |
| 4,903,261 A | 2/1990 | Baran et al. |
| 4,922,486 A | 5/1990 | Lidinsky et al. |
| 4,933,937 A | 6/1990 | Konishi |
| 4,960,310 A | 10/1990 | Cushing |
| 4,962,497 A | 10/1990 | Ferenc et al. |
| 4,962,532 A | 10/1990 | Kasirai et al. |
| 4,965,772 A | 10/1990 | Daniel et al. |
| 4,970,678 A | 11/1990 | Sladowski et al. |
| 4,979,118 A | 12/1990 | Kheradpir .................. 364/436 |
| 4,980,897 A | 12/1990 | Decker et al. |
| 4,991,169 A | 2/1991 | Davis et al. |
| 5,003,595 A | 3/1991 | Collins et al. |
| 5,014,265 A | 5/1991 | Hahne et al. |
| 5,020,058 A | 5/1991 | Holden et al. |
| 5,033,076 A | 7/1991 | Jones et al. |
| 5,054,034 A | 10/1991 | Hughes-Hartogs |
| 5,059,925 A | 10/1991 | Weisbloom |
| 5,072,449 A | 12/1991 | Enns et al. |
| 5,088,032 A | 2/1992 | Bosack |
| 5,095,480 A | 3/1992 | Fenner |
| RE33,900 E | 4/1992 | Howson |
| 5,115,431 A | 5/1992 | Williams et al. |
| 5,128,945 A | 7/1992 | Enns et al. |
| 5,136,580 A | 8/1992 | Videlock et al. |
| 5,166,930 A | 11/1992 | Braff et al. |
| 5,199,049 A | 3/1993 | Wilson |
| 5,206,886 A | 4/1993 | Bingham |
| 5,208,811 A | 5/1993 | Kashio et al. |
| 5,212,686 A | 5/1993 | Joy et al. |
| 5,224,099 A | 6/1993 | Corbalis et al. |
| 5,226,120 A | 7/1993 | Brown et al. |
| 5,228,062 A | 7/1993 | Bingham |
| 5,229,994 A | 7/1993 | Balzano et al. |
| 5,237,564 A | 8/1993 | Lespagnol et al. |
| 5,241,682 A | 8/1993 | Bryant et al. |
| 5,243,342 A | 9/1993 | Kattemalalavadi et al. |
| 5,243,596 A | 9/1993 | Port et al. |
| 5,247,516 A | 9/1993 | Bernstein et al. |
| 5,249,178 A | 9/1993 | Kurano et al. |
| 5,253,251 A | 10/1993 | Aramaki |
| 5,255,291 A | 10/1993 | Holden et al. |
| 5,260,933 A | 11/1993 | Rouse |
| 5,260,978 A | 11/1993 | Fleischer et al. |
| 5,268,592 A | 12/1993 | Bellamy et al. |
| 5,268,900 A | 12/1993 | Hluchyj et al. |
| 5,271,004 A | 12/1993 | Proctor et al. |
| 5,274,631 A | 12/1993 | Bhardwaj |
| 5,274,635 A | 12/1993 | Rahman et al. |
| 5,274,643 A | 12/1993 | Fisk |
| 5,280,470 A | 1/1994 | Buhrke et al. |
| 5,280,480 A | 1/1994 | Pitt et al. |
| 5,280,500 A | 1/1994 | Mazzola et al. |
| 5,283,783 A | 2/1994 | Nguyen et al. |
| 5,287,103 A | 2/1994 | Kasprzyk et al. |
| 5,287,453 A | 2/1994 | Roberts |
| 5,291,482 A | 3/1994 | McHarg et al. |
| 5,305,311 A | 4/1994 | Lyles |
| 5,307,343 A | 4/1994 | Bostica et al. |
| 5,309,437 A | 5/1994 | Perlman et al. .......... 730/85.13 |
| 5,311,509 A | 5/1994 | Heddes et al. |
| 5,313,454 A | 5/1994 | Bustini et al. |
| 5,313,582 A | 5/1994 | Hendel et al. |
| 5,317,562 A | 5/1994 | Nardin et al. |
| 5,319,644 A | 6/1994 | Liang |
| 5,327,421 A | 7/1994 | Hiller et al. |
| 5,331,637 A | 7/1994 | Francis et al. |
| 5,345,445 A | 9/1994 | Hiller et al. |
| 5,345,446 A | 9/1994 | Hiller et al. |
| 5,359,591 A | 10/1994 | Corbalis et al. |
| 5,361,250 A | 11/1994 | Nguyen et al. |
| 5,361,256 A | 11/1994 | Doeringer et al. |
| 5,361,259 A | 11/1994 | Hunt et al. |
| 5,365,524 A | 11/1994 | Hiller et al. |
| 5,367,517 A | 11/1994 | Cidon et al. |
| 5,371,852 A | 12/1994 | Attanasio et al. |
| 5,386,567 A | 1/1995 | Lien et al. |
| 5,390,170 A | 2/1995 | Sawant et al. |
| 5,390,175 A | 2/1995 | Hiller et al. |
| 5,394,394 A | 2/1995 | Crowther et al. |
| 5,394,402 A | 2/1995 | Ross |
| 5,400,325 A | 3/1995 | Chatwani et al. |
| 5,408,469 A | 4/1995 | Opher et al. |
| 5,416,842 A | 5/1995 | Aziz |
| 5,422,880 A | 6/1995 | Heitkamp et al. |
| 5,422,882 A | 6/1995 | Hiller et al. |
| 5,423,002 A | 6/1995 | Hart |
| 5,426,636 A | 6/1995 | Hiller et al. |
| 5,428,607 A | 6/1995 | Hiller et al. |
| 5,430,715 A | 7/1995 | Corbalis et al. |
| 5,430,729 A | 7/1995 | Rahnema |
| 5,442,457 A | 8/1995 | Najafi |
| 5,442,630 A | 8/1995 | Gagliardi et al. |
| 5,452,297 A | 9/1995 | Hiller et al. |
| 5,473,599 A | 12/1995 | Li et al. |
| 5,473,607 A | 12/1995 | Hausman et al. |
| 5,477,541 A | 12/1995 | White et al. |
| 5,485,455 A | 1/1996 | Dobbins et al. |
| 5,490,140 A | 2/1996 | Abensour et al. |
| 5,490,257 A | 2/1996 | Fenner |
| 5,491,687 A | 2/1996 | Christensen et al. |
| 5,491,804 A | 2/1996 | Heath et al. |
| 5,497,368 A | 3/1996 | Reijnierse et al. |
| 5,504,747 A | 4/1996 | Sweasey |
| 5,509,006 A | 4/1996 | Wilford et al. |
| 5,517,494 A | 5/1996 | Green |
| 5,519,704 A | 5/1996 | Farinacci et al. |
| 5,519,858 A | 5/1996 | Walton et al. ............... 395/600 |
| 5,526,489 A | 6/1996 | Nilakantan et al. |
| 5,530,963 A | 6/1996 | Moore et al. |
| 5,535,195 A | 7/1996 | Lee |
| 5,539,734 A | 7/1996 | Burwell et al. |
| 5,541,911 A | 7/1996 | Nilakantan et al. |
| 5,546,370 A | 8/1996 | Ishikawa |
| 5,555,244 A | 9/1996 | Gupta et al. |
| 5,561,669 A | 10/1996 | Lenney et al. |
| 5,583,862 A | 12/1996 | Callon |
| 5,592,470 A | 1/1997 | Rudrapatna et al. |
| 5,598,581 A | 1/1997 | Daines et al. |
| 5,600,798 A | 2/1997 | Chenrukuri et al. |
| 5,604,868 A | 2/1997 | Komine et al. |
| 5,608,726 A | 3/1997 | Virgile |
| 5,617,417 A | 4/1997 | Sathe et al. |
| 5,617,421 A | 4/1997 | Chin et al. |
| 5,630,125 A | 5/1997 | Zellweger |
| 5,631,908 A | 5/1997 | Saxe |
| 5,632,021 A | 5/1997 | Jennings et al. |
| 5,634,010 A | 5/1997 | Ciscon et al. |
| 5,638,359 A | 6/1997 | Peltola et al. |
| 5,644,718 A | 7/1997 | Belove et al. |

| | | | | | |
|---|---|---|---|---|---|
| 5,659,684 A | 8/1997 | Giovannoni et al. | 5,748,617 A | 5/1998 | McLain, Jr. |
| 5,666,353 A | 9/1997 | Klausmeier et al. | 5,754,547 A | 5/1998 | Nakazawa |
| 5,673,265 A | 9/1997 | Gupta et al. | 5,802,054 A | 9/1998 | Bellenger |
| 5,678,006 A | 10/1997 | Valizadeh et al. | 5,835,710 A | 11/1998 | Nagami et al. |
| 5,680,116 A | 10/1997 | Hashimoto et al. | 5,854,903 A | 12/1998 | Morrison et al. |
| 5,684,797 A | 11/1997 | Aznar et al. | 5,856,981 A | 1/1999 | Voelker |
| 5,687,324 A | 11/1997 | Green et al. | 5,892,924 A | 4/1999 | Lyon et al. ............ 395/200.75 |
| 5,689,506 A | 11/1997 | Chiussi et al. | 5,898,686 A | 4/1999 | Virgile |
| 5,694,390 A | 12/1997 | Yamato et al. | 5,903,559 A | 5/1999 | Acharya et al. |
| 5,724,351 A | 3/1998 | chao et al. | | | |
| 5,748,186 A | 5/1998 | Raman | * cited by examiner | | |

ACCESS CONTROL LIST PROCESSING IN HARDWARE

In a computer network for transmitting information, messages can be restricted from being transmitted from selected source devices to selected destination devices. In known computer networks, this form of restriction is known as "access control" and is performed by routers, which route messages (in the form of individual packets of information) from source devices to destination devices. One known technique for access control is for each router to perform access control by reference to one or more ACLs (access control lists); the ACL describes which selected source devices are permitted (and which denied) to send packets to which selected destination devices.

In a known standard for ACL format, each ACL includes a plurality of access control specifiers, each of which selects a range of sender and destination IP address prefix or subnet, and port, and provides that packet transmission from that selected set of senders to that selected set of destinations is either specifically permitted or specifically denied. ACLs are associated with input interfaces and independently with output interfaces for each router. In known routers such as those manufactured by Cisco Systems, Inc., of San Jose, Calif., the router is provided with an ACL using an ACL command language, interpreted by operating system software for the router, such as the IOS operating system.

One problem in the known art is that processing of packets to enforce access control according to the ACL is processor-intensive and can therefore be relatively slow, particularly in comparison with desired rates of speed for routing packets. This problem is exacerbated when access control is enforced for packets using software in the router, because software processing of the ACL can be quite slow relative to hardware processing of the packet for routing.

One known solution is to reduce the number of packets for which access control requires actual access to the ACL. In a technique known as "netflow switching," packets are identified as belonging to selected "flows," and each packet in a flow is expected to have identical routing and access control characteristics. Therefore, access control only requires reference to the ACL for the first packet in a flow; subsequent packets in the same flow can have access control enforced identically to the first packet, by reference to a routing result cached by the router and used for the entire flow.

Netflow switching is further described in detail in the following patent applications:

U.S. application Ser. No. 08/581,134, titled "Method For Traffic Management, Traffic Prioritization, Access Control, and Packet Forwarding in a Datagram Computer Network", filed Dec. 29, 1995, in the name of inventors David R.

Cheriton and Andreas V. Bechtolsheim, assigned to Cisco Technology, Inc., attorney docket number CIS-019;

U.S. application Ser. No. 08/655,429, titled "Network Flow Switching and Flow Data Export", filed May 28, 1996, in the name of inventors Darren Kerr and Barry Bruins, and assigned to Cisco Technology, Inc., attorney docket number CIS-016; and U.S. application Ser. No. 08/771,438, titled "Network Flow Switching and Flow Data Export", filed Dec. 20, 1996, in the name of inventors Darren Kerr and Barry Bruins, assigned to Cisco Technology, Inc., attorney docket number CIS-017.

These patent applications are collectively referred to herein as the "Netflow Switching Disclosures". Each of these applications is hereby incorporated by reference as if fully set forth herein.

While netflow switching achieves the goal of improving the speed of enforcing access control by the router, it still has the drawback that comparing at least some incoming packets against the ACL must be performed using software. Thus, the relative slowness required by software processing of the ACL is not completely avoided.

A second problem in the known art is that software processing of the ACL takes increased time when the ACL has numerous entries, such as when the requirements for access control are complex. The more entries in the ACL, the more time is expected to be required for software processing of the ACL, and thus the more time is expected to be required for software enforcement of access control. Since known routers require at least some software enforcement of access control, this reduces the routing speed at which the router can operate.

For example, for some large ACLs, routing speed can be reduced to as low as about 10,000 packets per second. However, the wirespeed rate of incoming packets is presently (for relatively short packets) about 1.5 million packets per gigabit per second transmission capacity, or in the range of about tens to hundreds of millions of packets per second for gigabit networks. Since it would be desirable for routers to operate at speeds comparable to the wirespeed, the present limitation on router speed is unacceptably low.

Accordingly, it would be desirable to provide a method and system for hardware processing of ACLs and thus hardware enforcement of access control. This advantage is achieved in an embodiment of the invention in which a sequence of access control specifiers from an ACL are recorded in a CAM (content-addressable memory), and in which matching (or lack of matching) of information from the packet header to specifiers recorded in the CAM are used to enforce access control.

SUMMARY OF THE INVENTION

The invention provides a method and system for hardware processing of ACLs and thus hardware enforcement of access control. A sequence of access control specifiers from an ACL are recorded in a CAM, and information from the packet header is used to attempt to match selected source and destination IP addresses or subnets, ports, and protocols, against all the ACL specifiers at once. Successful matches are input to a priority selector, which selects the match with the highest priority (that is, the match that is first in the sequence of access control specifiers). The specified result of the selected match is used to permit or deny access for the packet without need for software processing, preferably at a rate comparable to wirespeed.

In a preferred embodiment, the CAM includes an ordered sequence of entries, each of which has an array of ternary elements for matching on logical "0", logical "1", or on any value, and each of which generates a match signal. The ACL entered for recording in the CAM can be optimized to reduce the number of separate entries in the CAM, such as by combining entries which are each special cases of a more general access control specifier.

A router including the CAM can also include preprocessing circuits for certain range comparisons which have been found both to be particularly common and to be otherwise inefficiently represented by the ternary nature of the CAM. For example, comparisons of the port number against known special cases, such as "greater than 1023" and "within the range 6000 to 6500", can be treated by circuitry for performing range comparisons or by reference to one or more auxiliary CAMs.

The invention can also be used to augment or override routing decisions otherwise made by the router, so as to implement QOS (quality of service), and other administrative policies, using the CAM.

DETAILED DESCRIPTION OF THE PREFERRED EMBODIMENT

In the following description, a preferred embodiment of the invention is described with regard to preferred process steps and data structures. Those skilled in the art would recognize after perusal of this application that embodiments of the invention can be implemented using circuits adapted to particular process steps and data structures described herein, and that implementation of the process steps and data structures described herein would not require undue experimentation or further invention.

System Elements

Figure 1:
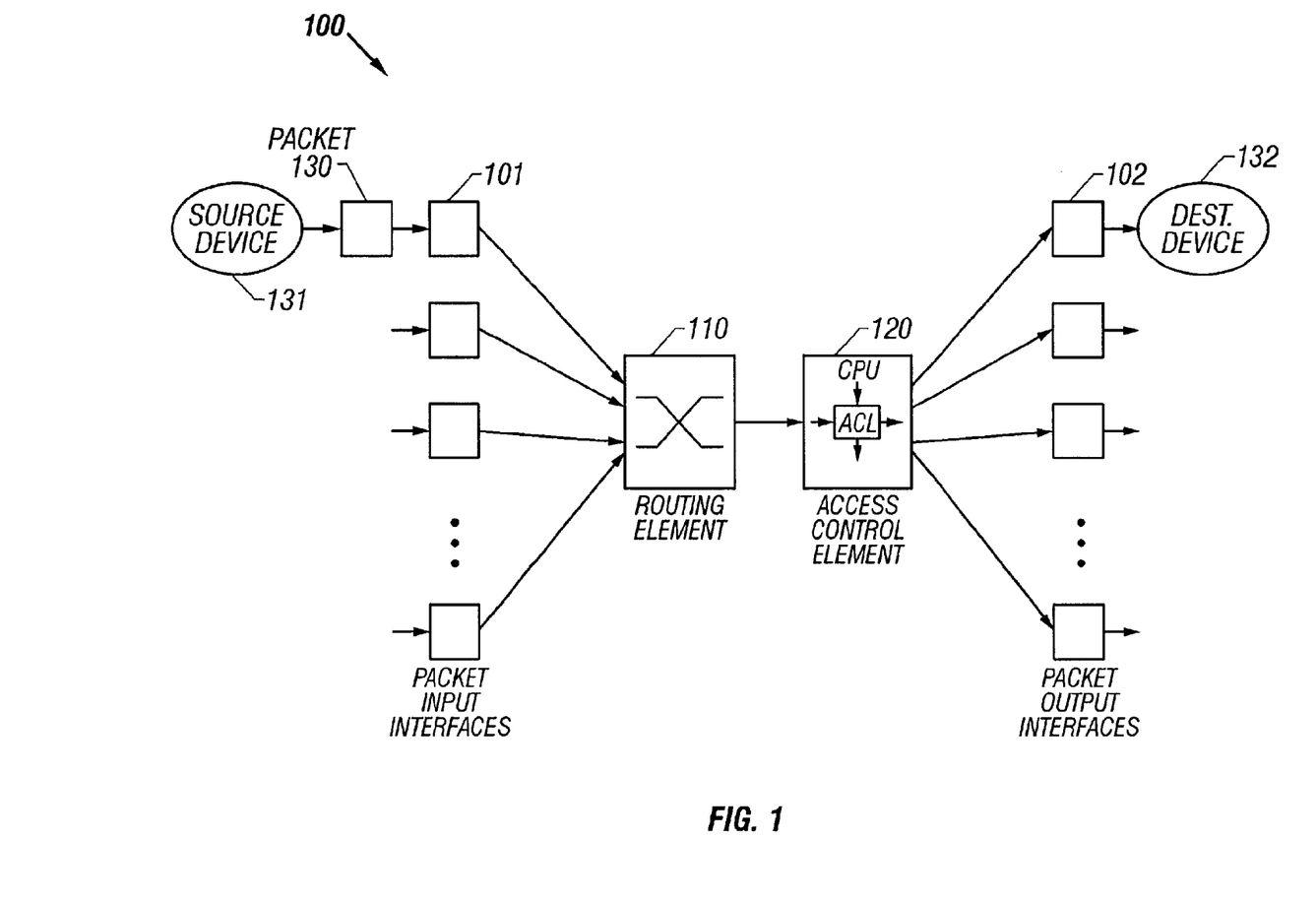
FIG. 1 shows a block diagram of a system for access control list processing.

FIG. 1 shows a block diagram of a system for access control list processing.

A system 100 includes a set of packet input interfaces 101, a routing element 10, an access control element 120, and a set of packet output interfaces 102. The system 100 receives packets 130 at the input interfaces 101; each packet 130 indicates a source device 131, from which it was sent, and a destination device 132, to which it is intended to go. The routing element 110 processes each packet 130 to select one or more of the output interfaces 102 to which the packet 130 should be forwarded. The access control element 120 determines if the packet 130 has permission to be forwarded from its source device 131 to its destination device 132. Each packet 130 that has permission to be forwarded is output to its selected output interfaces 102.

In a first set of alternative embodiments, the system 100 may include a plurality of access control elements 120 operating in parallel in place of the single access control element 120.

In a second set of alternative embodiments, the system 100 may include one or more access control elements 120 coupled to the input interfaces 101 and operating to determine if packets 130 have permission to be forwarded from their source devices 131 at all. The access control element 120 is shown coupled to the routing element 110 to perform access control after a routing decision has been made. However, the access control element 120 is still capable of denying access to packets 130 responsive to whether they have permission to be forwarded from their source devices 131 at all.

In a third set of alternative embodiments, the system 100 may include one or more access control elements 120 coupled to individual input interfaces 101 and operating to make access control determinations for packets 130 arriving at particular input interfaces 101. Similarly, the system 100 may include one or more access control elements 120 coupled to individual output interfaces 102 and operating to make access control determinations for packets 130 forwarded to particular output interfaces 102.

Access Control Element

Figure 2:
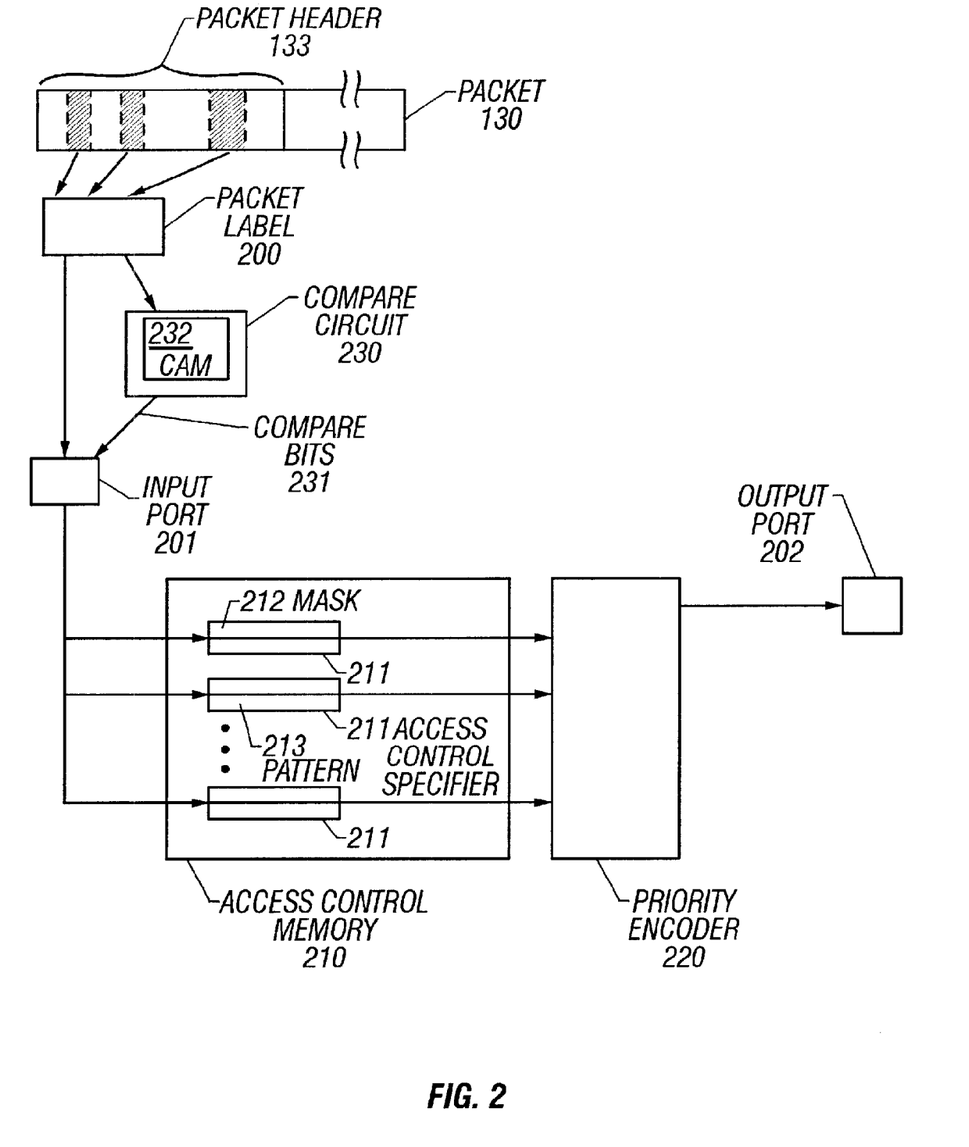
FIG. 2 shows a block diagram of an access control element.

FIG. 2 shows a block diagram of an access control element.

In a preferred embodiment, the access control element 120 operates on a set of selected elements of a packet header 133 for each packet 130. The system 100 collects the selected elements into a packet label 200.

In a preferred embodiment using netflow switching, the packet label 200 used for access control at the input interfaces 101 includes a source device 131, the destination device 132, a port identifier for a port at the source device 131, a port identifier for a port at the destination device 132, and a protocol type. In alternative embodiments, the packet label 200 may be any collection of information derived from the packet 130 (preferably from the packet header 133) used for access control.

The concept of preprocessing the packet label has wide applicability, including determining other routing information in response to data in the packet header. For example, in addition to or instead of comparing data in the packet header against known special cases, such as "greater than 1023" and "within the range 6000 to 6500," preprocessing can include performing logical or arithmetic operations on data in the packet header. Preprocessing can also include data lookup, or substituting new data, in response to data in the packet header.

The access control element 120 includes an input port 201 coupled to the packet label 200, an access control memory 210, a priority encoder 220, and an output port 202 coupled to the priority encoder 220.

When the access control element 120 is disposed for controlling access for packets responsive to their input interfaces 101, the packet label 200 includes an identifier for the input interface 101. When the access control element 120 is disposed for controlling access for packets responsive to their output interfaces 102, the packet label 200 includes an identifier for the output interface 102.

The access control memory 210 includes a CAM (content-addressable memory) having a sequence of access control specifiers 211. Each access control specifier 211 includes a label match mask 212 and a label match pattern 213. For each access control specifier 211, each bit of the label match mask 212 determines whether or not a corresponding bit of the packet label 200 is tested. If so, the corresponding bit of the label match pattern 213 is compared for equality with the corresponding bit of the packet label 200. If all compared bits are equal, the access control specifier 211 matches the packet label 200. Bits that are not compared have no effect on whether the access control specifier 211 is considered to match the packet label 200 or not.

The priority encoder 220 is coupled to all of the access control specifiers 211, and receives an indicator from each one whether or not that access control specifier 211 matched the packet label 200. The priority encoder 220 selects the single access control specifier 211 with the highest priority (in a preferred embodiment, the one with the lowest address in the access control memory 210) and provides an indicator of that single access control specifier 211 to the output port 202.

The indicator provided to the output port 202 specifies whether or not the packet 130 has permission to be forwarded from its specified source device 131 to its specified destination device 132. In a preferred embodiment, the indicator specifies one of three possibilities: (a) the packet 130 is forwarded to its calculated output interface and on to its specified destination device 132; (b) the packet 130 is dropped; or (c) the packet 130 is forwarded to a "higher-level" processor for further treatment. When a packet 130 is dropped it is effectively denied access from its specified source device 131 to its specified destination device 132.

The higher-level processor includes a general-purpose processor, program and data memory, and mass storage, executing operating system and application software for software (rather than hardware) examination of the packet 130. The packet 130 is compared, possibly to the access control specifiers 211 and possibly to other administrative policies or restrictions, by the higher-level processor. The higher-level processor specifies whether the packet 130, after processing by the higher-level processor, is forwarded to a selected output interface or is dropped.

Access Control Lists

A Cisco access control list includes a sequence of access control entries, which are mapped to a set of access control specifiers 211. Each access control entry has a structure according to the following syntax:

access-list access-list-number [dynamic dynamic-name [timeout minutes]] {deny|permit} protocol source source-wildcard [operator port [port]] destination destination-wildcard [operator port [port]] [established] [precedence precedence] [tos tos] [log]

This syntax, its meaning, and access control entries in general, are further described in documentation for Cisco IOS software, available from Cisco Systems, Inc., in San Jose, Calif., and hereby incorporated by reference as if fully set forth herein.

Access control entries can specify that particular actions are permitted, denied, or that they will be recorded in a log. Access control entries are interpreted sequentially. Thus, an earlier more specific access control entry can prohibit particular actions (such as receiving messages from a particular sending device), while a later more general access control entry can permit the same actions for other devices (such as other sending devices in the same network).

When an access control list is translated for entry into the access control memory, it is optimized to reduce the number of separate entries that are used. Thus, an access control list with N separate access control entries is translated into a set of access control specifiers 211 that can be smaller or larger than N, depending on the effect of optimization.

A first optimization detects separate access control entries that each refer to a special case of a more general access control specifier 211, such as in one of the following cases:

A first access control entry provides a selected permission for a selected source device 131 2S, and a second access control entry provides the same permission for a selected source device 131 2S+1. The first and second access control entries can be translated into a single more general access control specifier 211 with an unmatched bit in the $2^0$ position.

A set of access control entries each provides the same selected permission for a range of selected source devices 131 S through T, and the range S through T can be represented as a smaller number of bit strings with unmatched bits.

A set of access control entries provides a selected permission for a comparison of source device 131 addresses with a test value V.

A second optimization detects range comparisons that have been found to be particularly common. For example, it is common to compare the source or destination port number for being greater than 1023, or for being within the range 6000 to 6500. To compare the source or destination port number for being greater than 1023 with matched and unmatched bits would use about six entries for each such comparison (to test each one of the six high-order bits of the port number for being logical "1").

In a preferred embodiment, a comparison circuit 230 compares the source port number and the destination port number with these known ranges and provides a set of comparison bits 231 indicating whether or not the source port number and the destination port number are within each specified range. The comparison circuit 230 includes a finite state machine 232 (or other element) for storing lower and upper bounds for each specified range. The comparison bits 231 are coupled to the input port 201 of the access control element 120 for treatment as matchable input bits supplemental to the header of the packet 130.

In various embodiments, the invention can be used to augment or override routing decisions otherwise made by the router, using the access control element 120. In addition to specifying that the packet 130 is to be dropped or forwarded to the higher-level processor, the access control element 120 can alter the output interface, which was selected by the routing element 110, to another selected output interface. The invention can thus be used to implement QOS (quality of service) policies and other administrative policies.

Method of Operation

Figure 3:
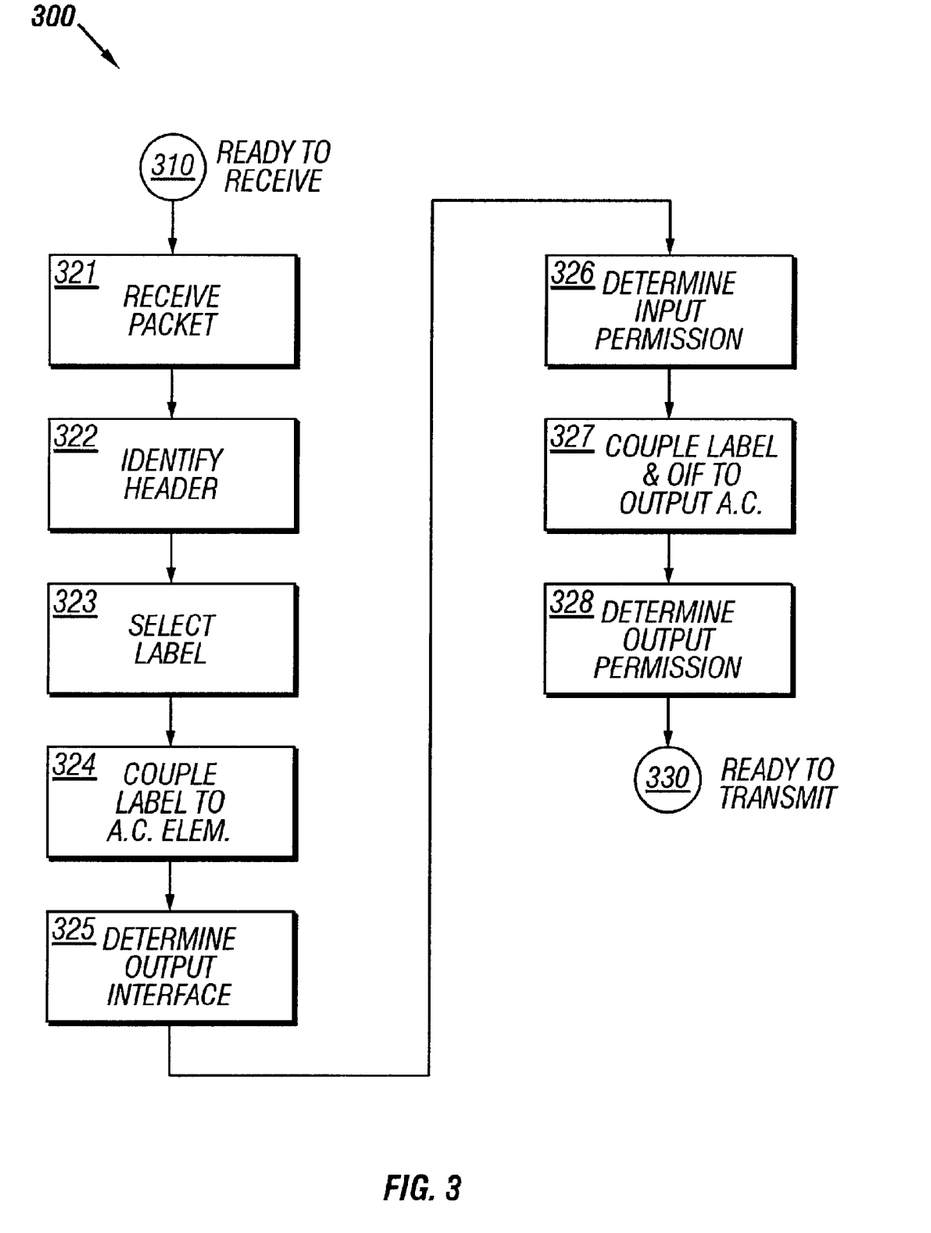
FIG. 3 shows a flow diagram of a method for access control list processing in hardware.

FIG. 3 shows a flow diagram of a method for access control list processing in hardware.

A method 300 includes a set of flow points to be noted, and steps to be executed, cooperatively by the elements of the system 100.

At a flow point 310, a packet is received at one of the packet input inter-faces 101.

At a step 321, the routing element 110 receives an input packet 130.

At a step 322, the routing element 110 identifies the header for the packet 130.

At a step 323, the routing element 110 selects portions of the header for use as the packet label 200 for access control. In a preferred embodiment, the packet label 200 used for access control at the input interfaces 101 includes the source device 131, the destination device 132, the port identifier at the source device 131, the port identifier at the destination device 132, and a protocol type.

At a step 324, the routing element 110 couples the packet label 200 and an input interface specifier to the input access control element 120.

At a step 325, the routing element 10 determines a selected output inter-face for the packet 130.

At a step 326, preferably performed in parallel with the step 325, the input access control element 120 determines the input permission for the packet 130, that is, whether the routing element 110 permits forwarding the packet 130 from the source device 131 for the packet 130.

The step 326 includes matching the packet label 200 against the access control memory 210 for the input access control element 120, determining all of the successful matches, coupling the successful matches to the priority encoder 220 for the input access control element 120, determining the highest-priority match, and providing an output result from the input access control element 120.

If at the step 326, the input access control element 120 determines that the higher-level processor should process the packet 130, the higher-level processor processes the packet 130. A result from the higher-level processor is substituted for the result from the input access control element 120.

If at the step 326, the input access control element 120 (or the higher-level processor) determines that the packet 130 should be dropped, the packet 130 is dropped, and the routing element 110 takes no further action with regard to the packet 130.

At a step 327, the routing element 110 couples the packet label 200 and the output interface specifier to the output access control element 120.

At a step 328, the output access control element 120 determines the output permission for the packet 130, that is, whether the routing element 110 permits forwarding the packet 130 to the destination device 132 for the packet 130.

The step 326 includes the following actions:

matching the packet label 200 against the access control memory 210 for the out-put access control element 120;

determining all of the successful matches;

coupling the successful matches to the priority encoder 220 for the output access control element 120;

determining the highest-priority match; and providing an output result from the output access control element 120.

If at the step 328, the output access control element 120 determines that the higher-level processor should process the packet 130, the higher-level processor processes the packet 130. A result from the higher-level processor is substituted for the result from the output access control element 120.

If at the step 328, the output access control element 120 (or the higher-level processor) determines that the packet 130 should be dropped, the packet 130 is dropped, and the routing element 110 takes no further action with regard to the packet 130.

At a flow point 330, the packet is ready for transmission to one of the packet output interfaces 102.

Alternative Embodiments

Although preferred embodiments are disclosed herein, many variations are possible which remain within the concept, scope, and spirit of the invention, and these variations would become clear to those skilled in the art after perusal of this application.

What is claimed is:

1. A method, including the steps of maintaining a set of access control patterns in at least one associative memory;

receiving a packet label responsive to a packet, said packet label being sufficient to perform access control processing for said packet;

matching matchable information, said matchable information being responsive to said packet label, with said set of access control patterns in parallel, and generating a set of matches in response thereto, each said match having priority information associated therewith;

selecting at least one of said matches in response to said priority information, and generating an access result in response to said at least one selected match; and making a outing-decision in response to said access result.

2. A method as in claim 1, including the step of performing at least two of said steps of receiving, matching, selecting, and making a routing decision, in parallel using a pipeline technique.

3. A method as in claim 1, wherein said access control patterns each include a bit pattern for matching and a mask pattern of bits not for matching.

4. A method as in claim 1, wherein said access control patterns each include a set of ternary elements, each representative of a logical "0," logical "1", or "don't care" value.

5. A method as in claim 1, wherein said associative memory includes a hardware content-associative memory having a plurality of rows, each row including one of said access control patterns and one of said access results.

6. A method as in claim 1, wherein said associative memory includes a hardware content-associative memory having a plurality of rows, each row including a bit pattern for matching and one of said access results, and each row being associated with a pattern of bits not for matching, said set of patterns of bits not for matching being fewer than a number of said rows.

7. A method as in claim 1, wherein said associative memory includes a ternary content-associative memory.

8. A method as in claim 1, wherein said packet label includes a source IP address or subnet, a destination IP address or subnet, a source port, a destination port, a protocol specifier, or an input interface.

9. A method as in claim 1, wherein said priority information for each said access control pattern is responsive to a position of said access control pattern in a memory.

10. A method as in claim 1, wherein said priority information includes a position in said associative memory, and said step of selecting includes choosing a first one of said matches.

11. A method as in claim 1, wherein said routing decision includes a committed access rate decision.

12. A method as in claim 1, wherein said routing decision includes an administrative policy decision regarding treatment of said packet.

13. A method as in claim 1, wherein said routing decision includes determining an output interface for said packet.

14. A method as in claim 1, wherein said routing decision includes implementing a quality of service policy.

15. A method as in claim 1, wherein said routing decision includes permitting or denying access for said packet.

16. A method as in claim 1, wherein said step of generating said access result is responsive to a plurality of said at least one matches.

17. A method as in claim 1, wherein said step of matching is performed in order of constant time, whereby said step of matching is performed in time not responsive to a number of said access control patterns.

18. A method as in claim 1, wherein said steps of matching and selecting are performed at a rate exceeding 1 megapacket per second.

19. A method as in claim 1, including the step of making a preliminary routing decision for said packet, wherein said packet routing information includes a result of said preliminary routing decision.

20. A method as in claim 19, wherein said preliminary routing decision includes determining at least one output interface for said packet.

21. A method as in claim 19, wherein said packet routing information includes an output interface for said packet.

22. A method as in claim 1, including the step of preprocessing said packet label to generate said matchable information.

23. A method as in claim 22, wherein said step of preprocessing includes the steps of performing an arithmetic, logical, or comparison operation on said packet label; and generating a bit string for said matchable information in response to said arithmetic, logical, or comparison operation.

24. A method as in claim 22, wherein said step of preprocessing includes the step of comparing a field of said packet label with an arithmetic range or mask value.

25. A method as in claim 22, wherein said step of preprocessing includes the step of comparing a source IP port value or a destination IP port value with a selected port value.

26. A method as in claim 1, including the step of postprocessing said selected match to generate said access result.

27. A method as in claim 26, wherein said step of postprocessing includes accessing a memory in response to a bitstring included in said selected match.

28. A method as in claim 1, wherein said set of access control patterns is responsive to a sequence of access control specifiers, each one of said sequence of access control specifiers declaring whether to permit or deny access for a set of packets.

29. A method as in claim 28, wherein said step of maintaining includes the steps of receiving said sequence of access control specifiers;

translating said sequence of access control specifiers into said sequence of access control patterns; and storing said sequence of access control patterns in said associative memory.

30. A method as in claim 29, wherein said step of translating includes the step of generating a plurality of said access control patterns in response to one of said access control specifiers.

31. A method as in claim 29, wherein said step of translating includes the step of generating a single one of said access control patterns in response to a plurality of said access control specifiers.

* * * * *

UNITED STATES PATENT AND TRADEMARK OFFICE
CERTIFICATE OF CORRECTION

PATENT NO.     : 6,377,577 B1                                                     Page 1 of 1
DATED          : April 23, 2002
INVENTOR(S)    : Bechtolsheim et al.

It is certified that error appears in the above-identified patent and that said Letters Patent is hereby corrected as shown below:

Column 7,
Line 48, please delete "outing-decision" and insert therefore -- routing decision --.

Signed and Sealed this

Twelfth Day of August, 2003

JAMES E. ROGAN
*Director of the United States Patent and Trademark Office*